US006778034B2

(12) United States Patent
Nir et al.

(10) Patent No.: US 6,778,034 B2
(45) Date of Patent: Aug. 17, 2004

(54) EMI FILTERS

(75) Inventors: Shlomo Nir, Ramat Hasharon (IL); Konstantin Povolotski, Kfar Saba (IL); Alexander Axelrod, Moshav Hanniel (IL)

(73) Assignee: G.M.W.T. (Global Micro Wire Technology) Ltd., Even Yehuda (IL)

( * ) Notice: Subject to any disclaimer, the term of this patent is extended or adjusted under 35 U.S.C. 154(b) by 4 days.

(21) Appl. No.: 10/139,749

(22) Filed: May 7, 2002

(65) Prior Publication Data

US 2003/0210104 A1 Nov. 13, 2003

(51) Int. Cl.[7] .................................................. H04B 3/28

(52) U.S. Cl. .......................................... 333/12; 333/202

(58) Field of Search ................................. 333/182, 185, 333/12, 184, 186, 202, 204, 206; 174/122 V, 120 V, 121, 124, 122, 128.1, 121 V, 122 G

(56) References Cited

U.S. PATENT DOCUMENTS

| | | | | | |
|---|---|---|---|---|---|
| 4,209,229 | A | * | 6/1980 | Rittler | 385/123 |
| 4,301,428 | A | * | 11/1981 | Mayer | 333/12 |
| 4,553,114 | A | * | 11/1985 | English et al. | 333/182 |
| 5,594,397 | A | * | 1/1997 | Uchikoba et al. | 333/202 |
| 5,756,998 | A | * | 5/1998 | Marks et al. | 250/324 |
| 5,817,982 | A | * | 10/1998 | Arumugasaamy et al. | 174/120 R |
| 6,225,876 | B1 | * | 5/2001 | Akino et al. | 333/182 |
| 6,553,910 | B2 | * | 4/2003 | Fogle, Jr. | 102/202.2 |

OTHER PUBLICATIONS

K–Y Wang et al., Glass–Coated Hard–Magnetic FE–CO–CR Microwires, Received Jul. 24, 1997, Final form Aug. 22, 1997, pp. L573–576.

A. N. Antonenko et al., High Frequency Properties of Glass–Coated Microwire, Journal of Applied Physics vol. 83(11), Jun. 1, 1998, pp. 6587–6589.

Global Micro Wire Technologies Ltd., Microwire and Miniaturization Background, History and Applications of Glass Coated Microwire, http://www.gmwt–gw.com/articles1.asp?id=53, Nov. 10, 2003, 4 pages.

C. Palmer, Brief Communication, A Microwire Technique for Recording Single Neurons in Unrestrained Animals, Brian Research Bulletin vol. 3, pp. 285–289, Aug. 15, 1977, Copyright 1978 Ankho International Inc.

J. J. Petrovic et al., Synthesis of Silicon Microwire, Received Jun. 21, 2001; accepted Aug. 1, 2001, J. Mater, Res., vol. 16, No. 10 Oct. 2001.

* cited by examiner

*Primary Examiner*—Michael Tokar
*Assistant Examiner*—Linh V Nguyen
(74) *Attorney, Agent, or Firm*—Oblon, Spivak, McClelland, Maier & Neustadt, P.C.

(57) ABSTRACT

An electromagnetic interference filter, including a core, having: at least one electrically conductive signal or power-insulated lead, at least one first layer surrounding the lead, made of glass-coated microwire, serving as a magnetic absorbent material, a tubular conductive material surrounding the first layer, and a substrate on which the core is mounted, the substrate is configured as a planar body having a top, a bottom and side surfaces, portions of the top and bottom surfaces are covered with electrically conductive material serving as signal and ground terminals and making electrical contact with the tubular conductive material of the core.

29 Claims, 4 Drawing Sheets

EMI FILTERS

FIELD OF THE INVENTION

The present invention relates to the suppression of undesirable radiated emissions and susceptibility in high-speed balanced communication interfaces, and more particularly to an electromagnetic interference (EMI) filter for use in such interfaces.

BACKGROUND OF THE INVENTION

Modern electronic equipment incorporates high-speed balanced communication interfaces, which are one of the dominant sources of undesirable radiated emission and susceptibility. Radiated emission stems primarily from common mode (CM) currents driven by electronic equipment onto attached communication cables. Electromagnetic interference (EMI) filters, used for suppression of CM currents, normally incorporate capacitors referred to the equipment chassis and CM chokes. In order to eliminate waveform distortions of communication signals, the value of such suppression capacitors, when used in high-speed interfaces (100 BaseT or similar), is limited to a maximum of 10–20 pF. This limitation makes the capacitors less efficient at frequencies below 300 MHz, and imposes the major role of CM rejection onto the CM chokes.

Existing commercially available CM chokes do not provide sufficiently high CM impedance in a wide frequency range. CM chokes produced by windings of pairs of signal wire on ferrite toroid usually have a resonant type of attenuation versus frequency curve, with poor performance outside of a relatively narrow stop-band. Thus, the attenuation curve falls significantly at frequencies both below and above the maximum CM attenuation.

The EMI filters of the present invention are of the lossy type, and are based on the unique absorption properties of glass-coated microwire, starting at frequencies above several MHz and steadily improving up to, and including, microwave frequency bands. Microwires employed in the EMI filters according to the invention have a metal core, typically with a diameter from 1 to 30 micrometers, coated by a thin glass layer. Such microwires may be manufactured by one of several well-known methods, e.g., those disclosed in U.S. Pat. No. 5,240,066 (Gorynin, et al.) and U.S. Pat. No. 5,756,998 (Marks, et al.). These microwires, are applied in the field of electronics, to achieve sensors, transducers, inductive coils, transformers, magnetic shields, devices, etc., as taught by U.S. Pat. No. 6,270,591 (Chiriac, et al.), but they have never been proposed as a CM noise-absorbing element in the construction of EMI filters. The absorption properties of the EMI filters according to the present invention are the result of magnetic loss phenomena in glass-coated advantageously amorphous metal microwires, which exhibit strong dissipation in a broad band of radio and microwave frequencies. FIGS. 1*a*, 1*b* demonstrate that microwire magnetic properties, in the form of magnetic permeability ($\mu = \mu' + j\mu''$) in a signal wire pair, may be achieved when the microwire is wound around the pair in such a way that the microwire is oriented along the magnetic field component produced by the CM currents.

The use of absorptive materials for CM noise suppression in cables is known from U.S. Pat. No. 4,506,235 (Mayer), in which it is noted that "the electromagnetic field of the symmetrical (differential) mode is confined between the two conductors while the electromagnetic field of the common mode is absorbed in the magnetic absorptive insulating composite." In this way, stronger absorption and attenuation were achieved for the CM currents, as compared with the undesirable attenuation of symmetrical (differential) currents. The same principle of segregation of the CM versus differential mode (DM) current components is employed in the EMI filter of the present invention, but with the following distinguishing features:

1) The "magnetic absorptive insulating composite" claimed in the above-mentioned '235 patent comprises "a flexible binder having embedded therein manganese-zinc ferrite particles, having a non-homogenous particulate mix consisting essentially of smaller particles of 10–100 μm and larger particles of 150–300 μm, but wherein said particles are at least as large as the size of the magnetic domain of the ferrite . . . " In the present invention, the absorbing media is composed of glass-coated microwires.
2) The Mayer invention has for its object "an improved electrical transmission cable with two conductors, protected against electromagnetic interferences (EMI)", while the object of the present invention is the provision of miniature EMI filter components, primarily for application inside protected equipment, on printed circuit boards (PCBs), mostly in the vicinity of interface connectors.
3) The Mayer U.S. Pat. Nos. 4,383,225 and 4,301,428 disclose, in general, filter wires and cables comprising an inner conductive wire or multi-conductive wire cable, covered with an outer layer of magnetic shielding. In contrast to the magnetic shielding layer of Mayer, the present invention utilizes a magnetic absorptive layer comprising a glass-coated microwire having a metal core exhibiting unique magnetic properties.

The novel EMI filters of the present invention have the following advantages, gained primarily due to the use of unique glass-coated microwire:

a) exclusive broadband and high CM attenuation characteristics, covering VHF, UHF and microwave frequency bands, substantially exceeding any existing ferrite-based CM chokes or lossy-type EMI filters in performance;
b) low differential-mode loss, up to at least 100 MHz, making the filters applicable on high-speed communication wire pairs; and
c) miniature size and SMD packaging, suitable for automatic placement on a customer's PCBs.

SUMMARY OF THE INVENTION

A broad object of the present invention is to provide a novel signal and/or power PCB-mounted EMI filter, affording high CM attenuation in a wide frequency band, based upon the use of special structures and materials having unique magnetic absorbing properties.

It is another object of the present invention to provide an EMI filter component that achieves high Common Mode (CM) attenuation values in the frequency range from about 10 MHz up to at least 18 GHz, and low attenuation to Differential Mode (DM) signals.

The invention therefore provides an electromagnetic interference filter, comprising a core having at least one electrically conductive signal or power-insulated lead; at least one first layer surrounding the lead, made of glass-coated microwire serving as magnetic absorbent material; a tubular conductive material surrounding the first layer, and a substrate on which the core is mounted, the substrate being configured as a planar body having a top, a bottom and side surfaces, portions of the top and bottom surfaces being covered with electrically conductive material serving as signal and ground terminals and making electrical contact with the tubular conductive material of the core.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1A:
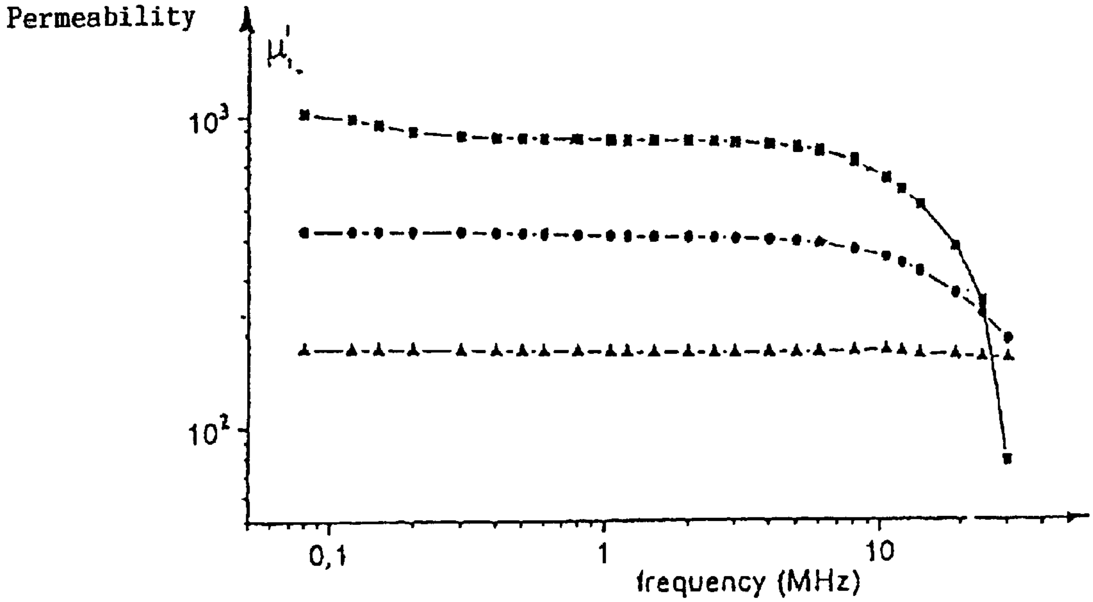
Figure 1B:
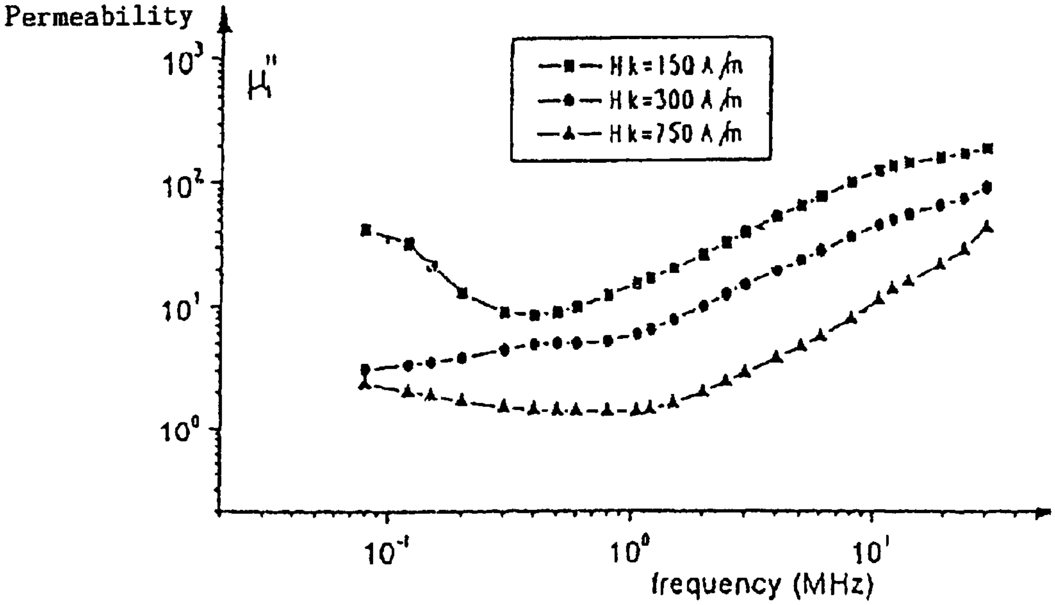
Figure 2:
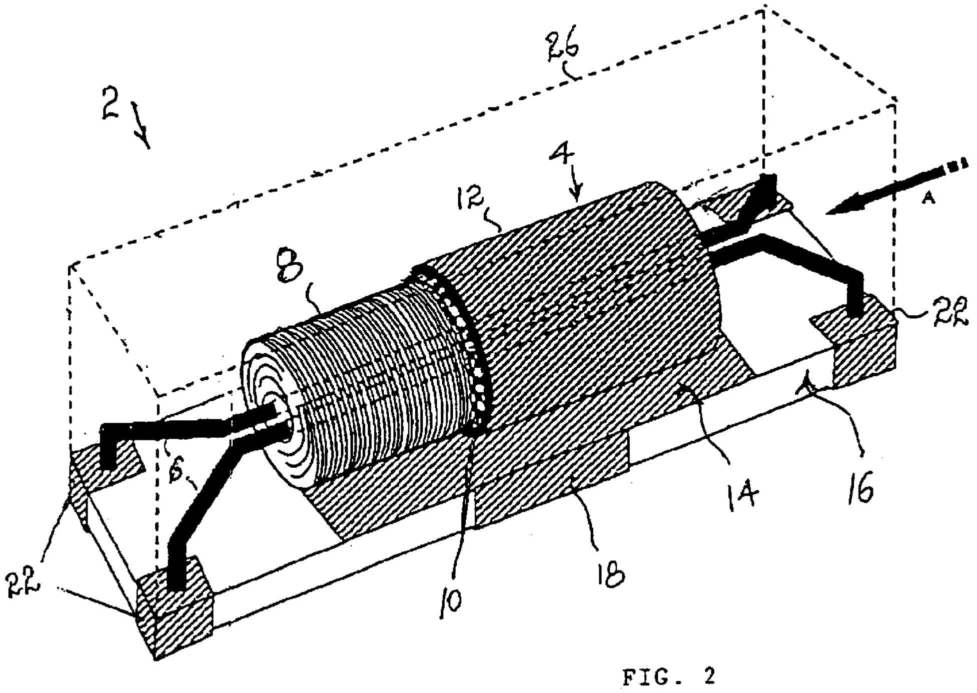
Figure 3:
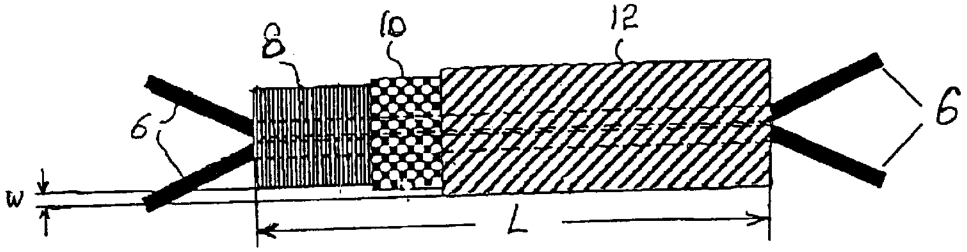
Figure 4A:
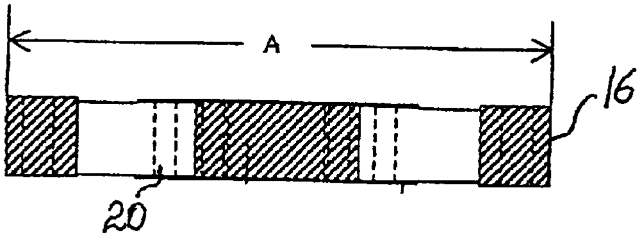
Figure 4B:
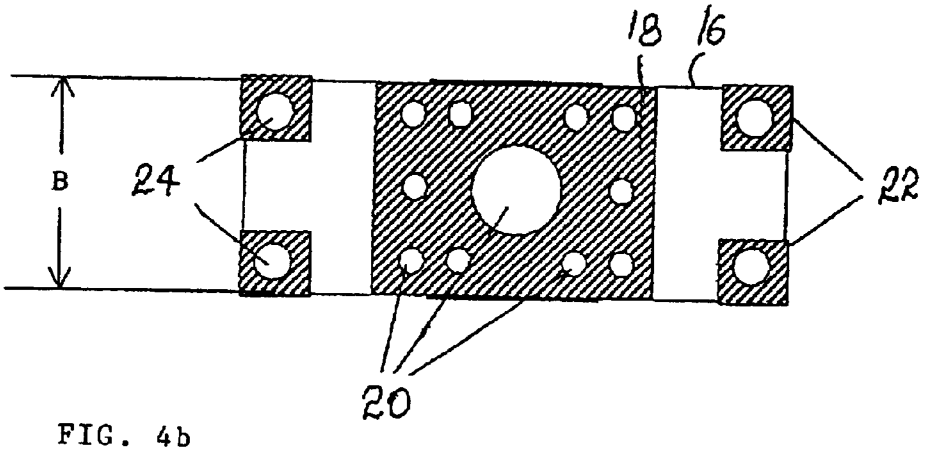
Figure 5:
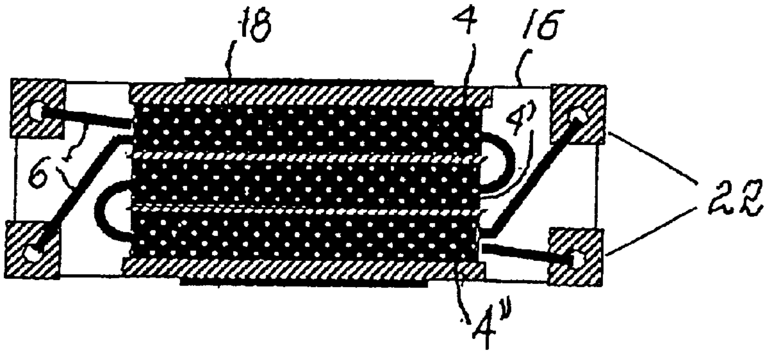
Figure 6A:
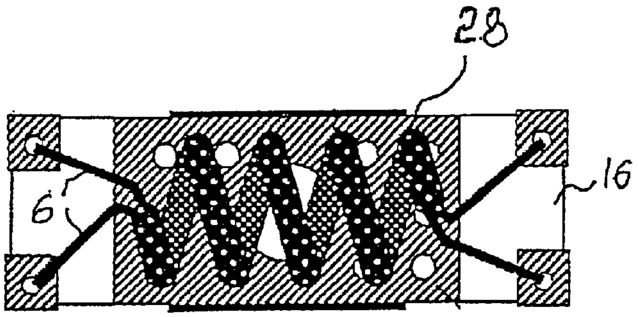
Figure 6B:
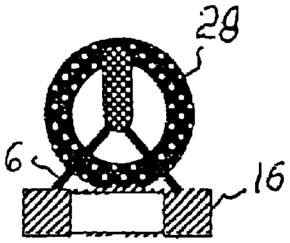
Figure 7:
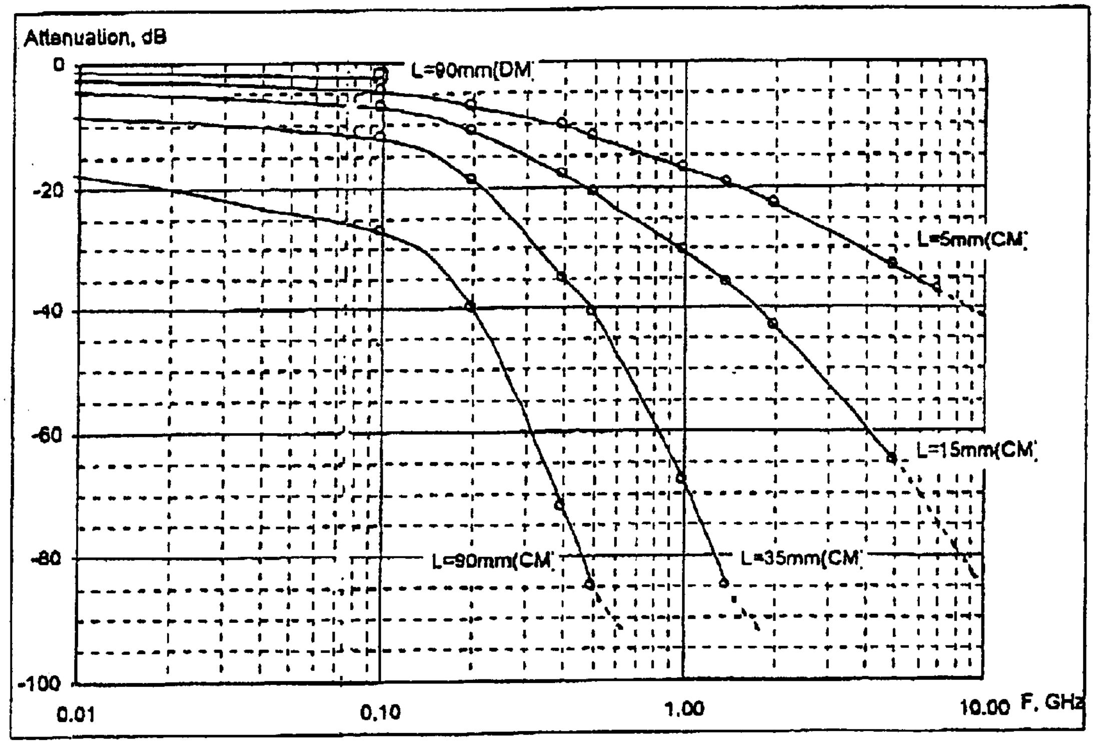

IN THE DRAWINGS:

FIGS. 1*a* and 1*b* are characteristic curves demonstrating magnetic properties of microwires;

FIG. 2 is an isometric view of the geometry of the basic filter core mounted on a dielectric substrate according to the present invention;

FIG. 3 is a detailed view of the filter core structure;

FIGS. 4*a* and 4*b* are side and top views, respectively, of a typical dielectric substrate of the EMI filter structure of the invention;

FIG. 5 is a top view of a z-configuration filter core structure according to the present invention, mounted on a dielectric substrate;

FIGS. 6*a* and 6*b* are top and side views, respectively, of a spiral configuration filter core structure according to the present invention, mounted on a dielectric substrate, and FIG. 7 is a graphical representation showing comparative CM and DM attenuation levels versus frequency, for samples constructed according to the present invention and having different filter core length values.

DETAILED DESCRIPTION

Referring now to FIGS. 2 and 3, there are depicted an isometric view and a detailed view of the structure of a basic EMI filter structure 2 according to a first embodiment of the invention. The filter structure 2 is composed of three major parts.

The first part of filter structure 2 is a filter core 4, comprising at least one lead 6 which is insulated electrically for conducting signals or power. In the embodiment shown in FIG. 2 and in the other figures there are illustrated a pair of leads 6. Lead 6 is typically 0.05 to 5.0 mm in diameter, is centrally located along the axis of filter core 4 in the direction of CM input/output current, as indicated by arrow A. Lead 6 is sheathed at least partially, with one or more layers of magnetically absorbent material 8, having a length L (FIG. 3) typically varying between 1 mm to 90 mm.

Material 8 is advantageously made of amorphous glass-coated microwires of a soft magnetic alloy, having a diameter of between $1\times10^{-6}$ m to $30\times10^{-6}$ m. According to a preferred embodiment, the metal alloy comprises a (CoMe) Bsi alloy, wherein Me is a metal selected from the group consisting of Fe, Mn, Ni and Cr. The microwires are wound around the leads 6 so that the direction of the microwire windings is substantially perpendicular to the direction of the leads. A thin optional insulating layer 10, e.g., of a thickness w between 10–200 $\mu$m, is disposed over the wound microwire to provide a physical and electrical barrier and to increase the dielectric strength of the filter core.

The use of magnetically absorbent amorphous material demonstrates a significant advantage in comparison with the use of known ferrite-based absorbent materials. The layers of microwires provide higher permeability of the absorbent layer in a much broader frequency range (see FIG. 7), and therefore up to at least 18 GHz higher attenuation per unit length of the filter core is obtained.

An external, conductive layer 12 surrounds insulating layer 10 and is electrically connected to the top surface 14 of the carrier substrate 16, providing significant high performance in the CM attenuation characteristics of the filter. Conductive layer 12 can be constituted by a braid of conductive wires, a conductive foil sheath, a conductive paint, a conductive adhesive material, or a conductive tube. This structure is lossy, due to the magnetic absorption material used in layer 8. The use of conductive layer 12 provides improved field confinement inside the lossy material layers, as compared with an unshielded filter. Moreover, conductive layer 12 decreases undesirable coupling between the input and output signal ports of the filter. As a result, greater CM energy losses and improved CM attenuation are achieved, especially at frequencies above 300 MHz.

The second part of filter structure 2, a carrier substrate 16 (see also FIG. 4), may be implemented in the form of a FR-4 PCB or High Frequency (HF) dielectric material, such as Teflon® or ceramic.

Shown in FIGS. 4*a* and 4*b* is a typical substrate structure used to carry the filter core(s) 4. The dimensions of the substrate typically vary, A equalling 2 to 8 mm and B equalling 1 to 4 mm. The central portion of substrate 16 is coated with a conductive metal layer 18, so that the metallic surface is continuous and forms an equi-potential surface. To decrease the inherent capacitance of the central portion, the upper and lower metal surfaces are connected by means of copper plated through holes 20. The metal surfaces of both narrow sides are used for soldering a connection to the ground surface of the electronic customer's PCB.

On the four corners of the substrate 16, there are located input/output filter terminals 22, with copper plated through holes 24, each hole accommodating one of the leads 6. The terminals are used for two purposes: one, for connecting the filter core leads 6 to the substrate 16 via the holes 24, and second, for soldering a connection to the various electronic customer's PCB.

The third part of filter structure 2 is non-metallic housing 26, which is an optional part of the filter structure used to protect the filter core from mechanical damages and environmental influence.

Another embodiment of an EMI filter structure in Z configuration according to the present invention is shown in FIG. 5. Here, there are odd numbers of separated filter cores 4, 4', 4", having a common pair of insulated conductive signal or power leads 6, and placed on the same substrate 16 (FIG. 4).

A still further embodiment of an EMI filter structure, in the form of a spiral 28, is shown in FIGS. 6*a* and 6*b*. The same, basic filter core 4 is provided, however, the length of microwire absorbing material 8 is longer. The core 4 is installed on the same substrate 16. Analyses and tests show that filter core structures having an absorbing layer with a longer length provide a higher level of CM noise attenuation for the same wide frequency band, with sufficiently low DM attenuation.

FIG. 7 depicts characteristic curves for filter cores of different lengths, built in accordance with the present invention.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electromagnetic interference filter, comprising: a core having:

at least one electrically conductive signal or power-insulated lead;

at least one first layer made of glass-coated metal microwire surrounding said lead and serving as a magnetic absorbent material; and a tubular conductive material surrounding said first layer; and a substrate on which said core is mounted, said substrate being configured as a planar body having a top, a bottom and side surfaces, portions of said top and bottom surfaces being covered with an electrically conductive material serving as signal and ground terminals and making electrical contact with the tubular conductive material.

2. The filter as claimed in claim 1, wherein said glass-coated metal microwire is wound around said lead in a direction substantially perpendicular to an axis of said lead.

3. The filter as claimed in claim 1, wherein a diameter of said glass-coated metal microwire is between $1\times10^{-6}$ m and $30\times10^{-6}$ m.

4. The filter as claimed in claim 1, wherein said metal comprises a (CoMe) Bsi alloy, wherein Me is a metal selected from the group consisting of Fe, Mn, Ni and Cr.

5. The filter as claimed in claim 1, further comprising an insulating second layer, disposed between said first layer and said conductive material, providing physical and electrical barriers and an increase in the dielectric strength of said core.

6. The filter as claimed in claim 5, wherein a thickness of said insulating second layer is in the range of between 10 to 200 $\mu$m.

7. The filter as claimed in claim 1, wherein said first layer has a Length of between 1 to 90 mm.

8. The filter as claimed in claim 1, wherein side surfaces of said substrate are at least partially coated with conductive material.

9. The filter as claimed in claim 1, wherein the electrically conductive material on the top surface of said substrate is interconnected to the electrically conductive material on the bottom surface thereof by holes passing through said substrate, said holes being lined with conductive material.

10. The filter as claimed in claim 1, wherein said substrate further comprises electrical terminals for interconnection with said lead.

11. The filter as claimed in claim 1, wherein said core has a cylindrical, a Z-shaped, or a spiral configuration.

12. The filter as claimed in claim 1, further comprising a housing made of a non-metallic material.

13. An electromagnetic interference filter, comprising:

first conducting means for conducting a first signal;

absorbing means for absorbing a magnetic field, said absorbing means including at least one first layer-made of glass-coated metal microwire surrounding said conducting means;

second conducting means for conducting a second signal and surrounding said first layer; and mounting means for mounting said first conducting means, said absorbing means, and said second conducting means, said mounting means configured as a planar body having a top, a bottom and side surfaces, portions of said top and bottom surfaces being covered with an electrically conductive material serving as signal and ground terminals and making electrical contact with the second conducting means.

14. The filter as claimed in claim 13, wherein said first layer comprises glass-coated amorphous metal microwire, said glass-coated metal microwire includes a core including a soft magnetic alloy.

15. The filter as claimed in claim 14, wherein said glass-coated metal microwire is wound around said first conducting means in a direction substantially perpendicular to an axis of said lead.

16. The filter as claimed in claim 14, wherein a diameter of said glass-coated metal microwire is between $1\times10^{-6}$ m and $30\times10^{-6}$ m.

17. The filter as claimed in claim 14, wherein said core comprises a (CoMe) Bsi alloy, wherein Me is a metal selected from the group consisting of Fe, Mn, Ni and Cr.

18. The filter as claimed in claim 13, further comprising an insulating second layer, disposed between said first layer and said second conducting means configured to provide physical and electrical barriers and an increase in the dielectric strength of said first conducting means, said absorbing means, and said second conducting means.

19. The filter as claimed in claim 18, wherein a thickness of said conducting means is in the range of between 10 and 200 $\mu$m.

20. The filter as claimed in claim 13, wherein a length of said first layer is between 1 and 90 mm.

21. The filter as claimed in claim 13, wherein side surfaces of said substrate are at least partially coated with a conductive material.

22. The filter as claimed in claim 13, wherein the electrically conductive material on the top surface of said substrate is interconnected to the electrically conductive material on the bottom surface thereof by holes passing through said mounting means, said holes being lined with conductive material.

23. The filter as claimed in claim 13, wherein said mounting means further comprises electrical terminals for interconnection with said first conducting means.

24. The filter as claimed in claim 13, wherein said first conducting means, said absorbing means, and said second conducting means each have a cylindrical, a Z-shaped, or a spiral configuration.

25. The filter as claimed in claim 13, further comprising a housing made of non-metallic material.

26. An electromagnetic interference filter, comprising:

a core, having:

at least one electrically conductive signal or power-insulated lead;

at least one first layer surrounding said lead, made of glass-coated microwires, serving as a magnetic absorbent material;

a tubular conductive material surrounding said first layer, and a substrate on which said core is mounted, said substrate being configured as a planar body having a top, a bottom and side surfaces, portions of said top and bottom surfaces being covered with electrically conductive material serving as signal and ground terminals and making electrical contact with the tubular conductive material of said core, wherein said first layer comprises glass-coated amorphous metal microwires, said microwires having a core made of soft magnetic alloy.

27. The filter as claimed in claim 26, wherein said microwires are wound around said lead in a direction substantially perpendicular to the axis of said lead.

28. The filter as claimed in claim 26, wherein the diameter of said microwires is between $1\times10^{-6}$ and $30\times10^{-6}$ m.

29. The filter as claimed in claim 26, wherein said core comprises a (CoMe) Bsi alloy, wherein Me is a metal selected from the group consisting of Fe, Mn, Ni and Cr.

* * * * *